INVENTORS
TATSURO HARUKI
YOSHIRO HAYASHI

BY Craig, Antonelli, Stewart & Hill

ATTORNEYS

United States Patent Office
3,626,761
Patented Dec. 14, 1971

3,626,761
SAMPLE-INTRODUCTION APPARATUS
FOR A GAS-CHROMATOGRAPH
Tatsuro Haruki and Yoshiro Hayashi, Kyoto, Japan,
assignors to Shinadzu Seisakusho Ltd.
Filed Sept. 24, 1970, Ser. No. 75,172
Int. Cl. B01d 15/08; G01n 1/00
U.S. Cl. 73—422 GC
6 Claims

ABSTRACT OF THE DISCLOSURE

A sample-introduction apparatus capable of introducing an accurate and fully controllable flow of a liquid-state sample into its vaporizer, by means of an intentional opening and closing operation of the valve, unaffected by pressure change of the carrier-gas or temperature change of the sample, in which a pressure-balancing tube is provided to connect the inlet port of the valve to the gaseous space over the liquid-state sample in the sample container.

BACKGROUND OF THE INVENTION

This invention relates to an improvement of a sample-introduction apparatus for a gas-chromatograph aimed at treating liquid-state samples.

Conventional sample-introduction apparatus for gas-chromatographs for treating liquid-state samples have been constructed, for instance, as shown in FIG. 2, in which the numerals indicate the following items, respectively:
21 indicates a carrier-gas intake tube; 22 indicates a pressure-control valve; 23 indicates a connecting tube; 27 indicates a valve for feeding-in or stopping the feed of a carrier-gas to a vaporizer 28; 29 indicates a heater for heating the vaporizer 28 to a predetermined temperature; 30 indicates a sample-introduction tube connected between the vaporizer 28 and the inner bottom part of a sample-container 26; 31 indicates a connecting tube between the vaporizer 28 and a column 32; 33 indicates a chromatograph detector for measuring a gas eluded from the column 32; and 36 indicates a gaseous space over a liquid-state sample 35 in the sample-container 26.

The operation of the conventional sample-introduction apparatus as shown in FIG. 2, is as follows:

In the normal operation, while the valve 27 is kept open, a carrier-gas, that is fed-in through the carrier-gas-intake tube 21, is led through the pressure-control valve 22 and the connecting tube 23, and through the vaporizer 28, into the sample-container 26, and is further led to the connecting tube 31, the column 32 and the detector 33 through the latter. In this normal state, the pressure in the space 36 of the sample-container 26 is balanced with the pressure of the carrier-gas within the vaporizer 28. When the valve 27 is closed in such state, the supply of carrier-gas from the intake tube 21 stops, while the gas inside the vaporizer 28 continues to flow through the connecting tube 31 and the column 32 into the detector 33, causing a lowering of pressure in the vaporizer 28. Consequently, owing to the pressure in the space 36 which has been kept in balance with the pressure of the carrier-gas, the liquid-state sample 35 is pushed through the sample-intake tube 30 into the vaporizer 28 and vaporizes. As a result, the vaporized sample mixes with the carrier-gas in the vaporizer 28 and is pushed through the connecting tube 31 into the column 32 and further to the detector 33.

As it is natural for such principle of the conventional sample-introduction apparatus that the liquid-state sample 35 is pushed into the vaporizer 28 by the pressure of the gas confined in the space 36 over the liquid-state sample 35 in the sample container 26, the liquid-state sample 35 is, at the beginning, forcibly pushed through the sample-introduction tube 30 into the vaporizer 28. But as the gaseous pressure in the space 36 gradually decreases, the pressure pushing up the liquid-state sample 36 decreases and the spouting of the liquid-state sample 35 into the vaporizer 28 gradually comes to a halt, causing the amount of the spout sample not to be exactly proportional to the period while the valve 27 is opened. Also a tailing inclination of liquid-state sample 35 hampers the correct control of its flow by the opening or closing operations of the valve 27, causing to lower the separation in the gas-chromatographic measurement. Furthermore, in such conventional apparatus, the pressure in the vaporizer 28 may happen to vary due to the adjustment of the carrier-gas flow rate, or due to the fluctuation in the gaseous pressure at the outlet of the pressure-control valve 22 within its range of precision, or due to an unanticipated pressure drop in the vaporizer 28 by a sudden gas leakage in the piping system such as at the connecting point of the pipe 30 to the vaporizer 28. In cases of such a pressure variation, the liquid-state sample will happen to flow through the sample-introduction tube 30 into the vaporizer 28, even when the valve 27 is not closed. Also in case of a change of temperature in the sample-container 26, the pressure of the space 36 may happen to change, causing the liquid-state sample to flow into the vaporizer 28. Thus, there exist certain shortcomings in the conventional apparatus; namely, that the liquid-state sample, which should essentially be conducted into the vaporizer 28 by a manipulation of the valve 27, is liable to be conducted into the vaporizer 28 by some undesirable cause, such as a pressure change of the carrier-gas, a temperature change in the sample-container 26, etc., resulting in producing erroneous output figures in the indicator 33.

SUMMARY OF THE INVENTION

The present invention is intended to eliminate the aforementioned shortcomings of the conventional sample-introduction apparatus for gas-chromatographs. The present invention is intended to provide a sample-introduction apparatus which is capable of introducing an accurate and fully controllable flow of a liquid-state sample into its vaporizer, by means of intentional opening and closing operations of the valve, unaffected by pressure changes of the carrier-gas or temperature changes of the sample.

The sample-introduction apparatus for a gas-chromatograph pursuant to this invention is characterized by comprising:

a valve whose inlet is connected to a carrier-liquid intake tube;

a vaporizer whose carrier-gas inlet is connected to an outlet side of the valve;

a pressure-balancing tube branching out from the inlet side of the valve; and a sealed-up sample-container to contain a liquid-state sample, and having in a gaseous space over the surface of the sample-liquid an open end of the pressure-balancing tube, and also having in its inner bottom an open lower end of a sample-introduction tube whose upper end is connected to a sample-inlet of the vaporizer.

BRIEF DESCRIPTION OF THE DRAWINGS

FIG. 1 is a somewhat schematic side elevational view of a sample-introduction apparatus for a gas-chromatograph embodying the present invention, while

Figure 1:
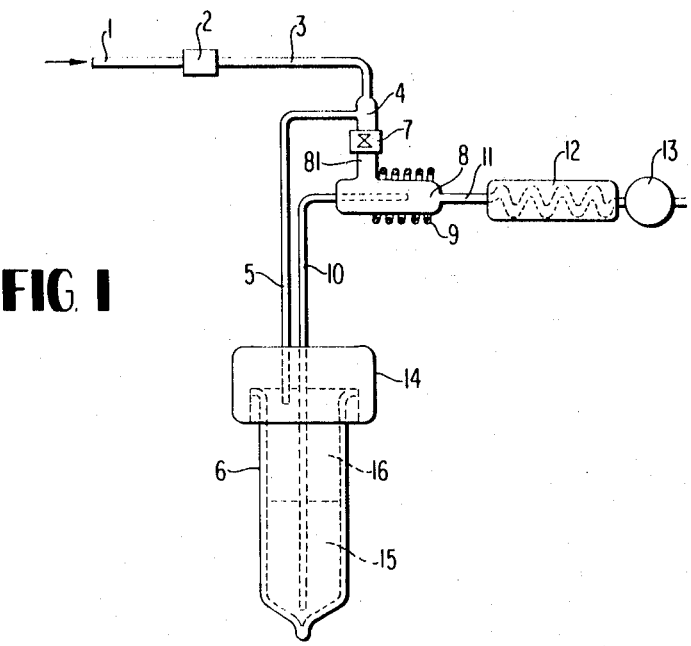
Figure 2:
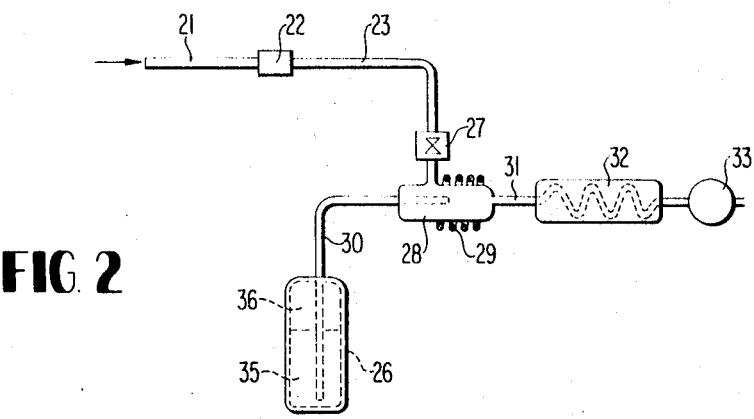
FIG. 2 is a somewhat schematic side elevational view of an example of a conventional sample-introduction apparatus.

The present invention will be described in detail hereinafter by reference to the example shown in FIG. 1, in which the reference numerals indicate the following items, respectively:

1 indicates a carrier-gas intake tube connected to a carrier-gas source which is omitted in the drawing for the sake of simplicity; 3 indicates a connecting tube; 2 indicates a pressure-control valve connected between the intake tube and the connecting tube 3; 4 indicates a branched tube connected to the outlet of the connecting tube 3; 5 indicates a pressure-balancing tube extending from the branched tube 4 into a space 16 over the liquid-state sample inside a sample-container 6 which is sealed off by a lid 14; 7 indicates a valve inserted between the branched tube 4 and a carrier-gas inlet 81 of a vaporizer 8; 9 indicates a heater for heating the vaporizer 8; 10 indicates a sample-introduction tube, of which the upper end is connected to a sample-inlet of the vaporizer 8, and the lower end is extended into the liquid-state sample 15 within the sample-container 6 and is open, i.e., terminates just above the bottom of the container; 11 indicates a connecting tube between the vaporizer 8 and a column 12; and 13 indicates a chromatographic detector for detecting the mixed gas output from the column 12.

In the normal operation of the sample-introduction apparatus for a gas-chromatograph of this invention thus constructed, the carrier-gas is fed, with the valve 7 open, from a conventional carrier-gas source (not shown), through the intake tube 1, the control valve 2, the connecting tube 3, the branched tube 4 and the valve 7, into the vaporizer 8, and at the same time, the space 16 in the sample-container 8 is kept in a pressure equilibrium with the pressure of the carrier-gas by means of the connection by the pressure-balancing tube 5 extending from the branched tube 4.

When the valve 7 is closed in this state, the carrier-gas stops flowing into the vaporizer 8, while the carrier-gas in the vaporizer 8 flows through the column 12, thereby reducing the pressure. On the other hand, the space 16 in the sample-container 6 is always replenished with carrier-gas by way of the pressure-balancing tube 5, thereby causing an unbalance between the gas pressure in the space 16 and that in the vaporizer 8. This unbalanced gas pressure pushes the liquid-state sample 15 through the introduction-tube 10 into the vaporizer 8 to vaporize the sample. This introduction speed remains constant during a period while the valve 7 is closed, because the pressure of the carrier-gas applied to the space 16 in the sample-container 6 is kept constant by the pressure-control valve 2. When the valve 7 is reopened, the pressure in the vaporizer 8 and that of the space 16 in the sample-container 6 return to a state of balance or equilibrium, and consequently, the force which has been pushing up the liquid-state sample 15 through the sample-introduction tube 10 immediately dies away, and the liquid-state sample 15 which has been pushed up to the top of the sample-introduction tube 10 immediately drops back on account of its own weight into the sample-container 6.

As is apparent from the foregoing operation, in this sample-introduction apparatus, an amount of the sample-liquid that is accurately proportional to the length of time of the closing of the valve 7, is introduced into the vaporizer 8, and as soon as the valve 7 is opened, the sample-liquid stops flowing into the vaporizer 8, and it stops in a clear-cut definite way without tailing, thus enabling an accurate chromatographic measurement. Furthermore, in this apparatus, as long as the valve 7 is open, the pressure in the space 16 in the sample-container 6 and that in the vaporizer 8 remain in balance, and therefore, even if the pressure upon the sample-liquid changes or the temperature in the sample-container 6 changes, there is no possibility of the sample-liquid being introduced into the vaporizer 8 by such undesirable changes. Thus, an accurate control of the sample-introduction can be ensured all times.

As is clear from what has been described above by reference to the illustrated embodiment, the sample-introduction apparatus for a gas-chromatograph according to this invention features that the hermetically sealed space over the liquid surface in the sample-container is connected by the pressure-balancing tube to the inlet of the valve located at the carrier-gas inlet of the vaporizer. Accordingly, the control of sample-introduction is made extremely accurate compared with the conventional apparatus. Such high stability and reliability of the apparatus according to the present invention prove to be of great industrial utility, especially in respect of the preparative gas-chromatography use.

While we have shown and described only one embodiment in accordance with the present invention, it is obvious that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A sample-introduction apparatus for a gas-chromatograph, characterized by:
   a valve whose inlet is connected to a carrier-gas intake tube;
   a vaporizer whose carrier-gas inlet is connected to an outlet side of the valve;
   a pressure-balancing tube branching out from the inlet side of said valve, and
   a substantially sealed-up sample-container adapted to contain a liquid-state sample, said sample-container being provided with a gas space over the surface of a sample-liquid, an open end of said pressure-balancing tube terminating in said gas space, and also being provided with an inner bottom, an open lower end of a sample-introduction tube terminating near said inner bottom whose upper end is connected to a sample-inlet of said vaporizer.

2. A sample-introduction apparatus for gas-chromatograph according to claim 1, wherein a pressure control valve for obtaining a constant pressure of the carrier-gas is inserted between said carrier-gas intake tube and said valve.

3. A sample-introduction apparatus for a gas-chromatograph according to claim 2, wherein the lower end of the sample-introduction tube is disposed just above the inner bottom of said sample-container.

4. A sample-introduction apparatus for a gas-chromatograph according to claim 1, wherein the lower end of the sample-introduction tube is disposed just above the inner bottom of said sample-container.

5. A sample-introduction apparatus for a gas-chromatograph comprising a valve to whose inlet a carrier-gas is fed and to whose outlet an inlet of a vaporizer is connected, a sealed-up sample-liquid container means, a sample-introduction tube having an open lower end terminating in said container means and havig a upper end which is connected to a sample-inlet of said vaporizer, and a pressure-balancing tube connected between the inlet of the valve and a gas space formed over the surface of a sample-liquid to balance the pressures thereof.

6. A sample-introduction apparatus for a gas-chromatograph, comprising vaporizer means, first means including a valve operable to be selectively opened and closed for selectively feeding a carrier-gas to said vaporizer means, container means for receiving sample-liquid therein, second means for conducting a sample-liquid from said container means to said vaporizer means when said valve is closed, and third means for applying the pressure prevailing in said first means, upstream of said valve, in the upper part of said container means where a gas space forms in the presence of a liquid-sample which will be located in the lower space thereof.

References Cited

UNITED STATES PATENTS

| | | | |
|---|---|---|---|
| 3,365,951 | 1/1968 | Jentysch | 73—422 GC |
| 3,475,964 | 11/1969 | Jenkins | 73—422 GC |

S. CLEMENT SWISHER, Primary Examiner

U.S. Cl. X.R.

55—197